(12) United States Patent
Hong (10) Patent No.: US 11,765,611 B2
(45) Date of Patent: Sep. 19, 2023

(54) METHOD, DEVICE AND SYSTEM FOR MINIMIZATION OF DRIVE TEST

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/962,506

(22) PCT Filed: Jan. 22, 2018

(86) PCT No.: PCT/CN2018/073624
§ 371 (c)(1),
(2) Date: Jul. 15, 2020

(87) PCT Pub. No.: WO2019/140685
PCT Pub. Date: Jul. 25, 2019

(65) Prior Publication Data
US 2020/0351696 A1    Nov. 5, 2020

(51) Int. Cl.
*H04W 8/22* (2009.01)
*H04W 16/18* (2009.01)
(Continued)

(52) U.S. Cl.
CPC ............ *H04W 24/10* (2013.01); *H04W 8/22* (2013.01); *H04W 16/18* (2013.01); *H04W 24/02* (2013.01);
(Continued)

(58) Field of Classification Search
CPC ....... H04B 17/0082–3913; H04L 5/003–0098; H04W 8/22–245;
(Continued)

(56) References Cited

U.S. PATENT DOCUMENTS 9,402,197 B2    7/2016 Fujishiro
2013/0095860 A1    4/2013 Hapsari
(Continued)

FOREIGN PATENT DOCUMENTS

CN    101365223 A    2/2009
CN    101646197 A    2/2010
(Continued)

OTHER PUBLICATIONS

3GPP TS 37.320 V10.2.0 (Jun. 2011), Universal Terrestrial Radio Access (UTRA) and Evolved Universal Terrestrial Radio Access (E-UTRA); Radio measurement collection for Minimization of Drive Tests (MDT); Overall description; Stage 2 (Release 10).
(Continued)

*Primary Examiner* — Timothy J Weidner
(74) *Attorney, Agent, or Firm* — SYNCODA LLC; Feng Ma (57) ABSTRACT

A method for minimization of drive tests (MDT) measurement includes: determining an identifier of a target network environment to be measured corresponding to a target terminal device; sending MDT configuration information to the target terminal device, the MDT configuration information including the identifier of the target network environment; and receiving measurement information of the target network environment from the target terminal device, the measurement information of the target network environment being associated with mobile network signal information of the target terminal device.

17 Claims, 4 Drawing Sheets

(51) Int. Cl.

| | | |
|---|---|---|
| *H04W 24/02* | (2009.01) | |
| *H04W 24/10* | (2009.01) | |
| *H04W 48/02* | (2009.01) | |
| *H04W 48/08* | (2009.01) | |
| *H04W 52/02* | (2009.01) | |
| *H04W 84/04* | (2009.01) | |
| *H04W 84/12* | (2009.01) | |
| *H04W 88/06* | (2009.01) | |
| *H04W 88/10* | (2009.01) | |
| *H04W 88/18* | (2009.01) | |
| *H04W 92/02* | (2009.01) | |
| *H04W 92/10* | (2009.01) | |

(52) U.S. Cl.
CPC ........... *H04W 48/02* (2013.01); *H04W 48/08* (2013.01); *H04W 52/0212* (2013.01); *H04W 52/0225* (2013.01); *H04W 84/042* (2013.01); *H04W 84/12* (2013.01); *H04W 88/06* (2013.01); *H04W 88/10* (2013.01); *H04W 88/18* (2013.01); *H04W 92/02* (2013.01); *H04W 92/10* (2013.01)

(58) Field of Classification Search
CPC ... H04W 16/18–225; H04W 24/02–10; H04W 36/005–385; H04W 48/02–20; H04W 52/02–0296; H04W 72/005–14; H04W 84/005–22; H04W 88/02–12; H04W 92/02; H04W 92/04; H04W 92/10; Y02D 30/70
See application file for complete search history.

(56) References Cited

U.S. PATENT DOCUMENTS

| | | | |
|---|---|---|---|
| 2014/0044002 A1 | 2/2014 | Fujishiro | |
| 2014/0295840 A1 | 10/2014 | Keskitalo | |
| 2015/0163745 A1* | 6/2015 | Kim | H04W 52/0235 |
| 2015/0312850 A1* | 10/2015 | Li | H04W 24/10 |
| 2016/0044567 A1 | 2/2016 | Baghel et al. | |
| 2016/0044591 A1* | 2/2016 | Pao | H04W 48/12 |
| 2016/0080958 A1 | 3/2016 | Rinne et al. | |
| 2016/0100378 A1* | 4/2016 | Chang | H04W 48/16 |
| 2016/0316405 A1 | 10/2016 | Balan et al. | |
| 2016/0373992 A1 | 12/2016 | Jung et al. | |
| 2018/0160416 A1 | 6/2018 | Mitsui et al. | |
| 2018/0206183 A1 | 7/2018 | Li et al. | |
| 2018/0242181 A1 | 8/2018 | Tsutsui | |
| 2018/0324617 A1 | 11/2018 | Schmidt et al. | |
| 2019/0335390 A1 | 10/2019 | Li et al. | |
| 2021/0099895 A1* | 4/2021 | Hong | H04W 24/10 |

FOREIGN PATENT DOCUMENTS

| | | | |
|---|---|---|---|
| CN | 101998463 | A | 3/2011 |
| CN | 102149108 | A | 8/2011 |
| CN | 102457890 | A | 5/2012 |
| CN | 102595459 | A | 7/2012 |
| CN | 102685793 | A | 9/2012 |
| CN | 102860063 | A | 1/2013 |
| CN | 102892129 | A | 1/2013 |
| CN | 103039106 | A | 4/2013 |
| CN | 103458437 | A | 12/2013 |
| CN | 103460750 | A | 12/2013 |
| CN | 104285464 | A | 1/2015 |
| CN | 104581777 | A | 4/2015 |
| CN | 104717614 | A | 6/2015 |
| CN | 104853432 | A | 8/2015 |
| CN | 104904260 | A | 9/2015 |
| CN | 104904286 | A | 9/2015 |
| CN | 105103605 | A | 11/2015 |
| CN | 106031215 | A | 10/2016 |
| CN | 106899988 | A | 6/2017 |
| CN | 107251585 | A | 10/2017 |
| CN | 108401510 | A | 8/2018 |
| EP | 2860883 | A1 | 4/2015 |
| EP | 2934051 | A1 | 10/2015 |
| EP | 3300429 | B1 | 1/2020 |
| JP | 2016508328 | A | 3/2016 |
| RU | 2359410 | C1 | 6/2009 |
| WO | 2004079514 | A2 | 9/2004 |
| WO | 2011005751 | A2 | 1/2011 |
| WO | 2014165832 | A1 | 10/2014 |
| WO | 2014175882 | A1 | 10/2014 |
| WO | 2015168861 | A1 | 11/2015 |
| WO | 2016190254 | A1 | 12/2016 |
| WO | 2016208955 | A1 | 12/2016 |
| WO | 2017043296 | A1 | 3/2017 |

OTHER PUBLICATIONS

Notice of Allowance of the Russian application No. 2020126104, dated Nov. 6, 2020.
First Office Action of the Korean application No. 10-2020-7023227, dated May 20, 2021.
CMCC, Nokia, Xiaomi, OPPO, New WID: Bluetooth/WLAN measurement collection in MDT [online], 3GPP TSG RAN #78 RP/172820, Internet<URL:http://www.3gpp.org/ftp/tsg_ran/TSG_RAN/TSGR_78/Docs/RP-172820.zip>, 2017 Dec. 21, 2015.
First Office Action of the Japanese application No. 2020-537751, dated Aug. 3, 2021.
"3rd Generation Partnership Project; 3,4,7,1(Technical Specification Group Radio Access Network; Evolved Universal Terrestrial Radio Access (E-UTRA); Radio Resource Control (RRC); Protocol specification (Release 15)", 3GPP Draft; 36331-FO1, 3rd Generation Partnership Project (3GPP), Mobile Competence Centre; 650, Route Des Lucioles; F-06921 Sophia-Antipolis Cedex; France, Jan. 11, 2018 (Jan. 11, 2018), XP051385535.
Supplementary European Search Report in the European application No. 18900940.0, dated Aug. 12, 2021.
International Search Report in the international application No. PCT/CN2018/073624, dated Sep. 29, 2018.
English translation of the Written Opinion of the International Search Authority in the international application No. PCT/CN2018/073624, dated Sep. 29, 2018.
International Search Report in the international application No. PCT/CN2018/075850, dated Oct. 24, 2018.
English translation of the Written Opinion of the International Search Authority in the international application No. PCT/CN2018/075850, dated Oct. 24, 2018.
First Office Action of the Chinese application No. 201880000124.6, dated Sep. 2, 2020.
Second Office Action of the Chinese application No. 201880000124.6, dated Apr. 20, 2021.
Supplementary European Search Report in the European application No. 18904934.9, dated Aug. 18, 2021.
Office Action of the Indian application No. 202047038112, dated Aug. 31, 2021.
Notice of Allowance of the U.S. Appl. No. 16/967,272, dated Jan. 5, 2022.
Non-Final Office Action of the U.S. Appl. No. 16/967,272, dated Sep. 28, 2021.

* cited by examiner

METHOD, DEVICE AND SYSTEM FOR MINIMIZATION OF DRIVE TEST

CROSS-REFERENCE TO RELATED APPLICATION

This application is a U.S. national stage of International Patent Application No. PCT/CN2018/073624 filed on Jan. 22, 2018, the disclosure of which is incorporated by reference in its entirety.

TECHNICAL FIELD

The present application relates to the technical field of wireless communication, and particularly, to a method, device and system for minimization of drive tests (MDT) measurement.

BACKGROUND

In the technical field of wireless communication, for optimizing a mobile network, relevant information required for optimizing the mobile network is usually obtained by a minimization of drive tests (MDT) technology.

Specifically, in an indoor scenario, a terminal may measure signal information of a mobile network at a present position and may determine present position determination information, namely the terminal may make measurement for information of a Bluetooth (BT) device generating each presently detected BT signal or may make measurement for information of a wireless fidelity (Wi-Fi) device generating each presently detected Wi-Fi signal. Furthermore, the information of measured mobile network signal and the position determination information may be sent to a base station. Correspondingly, the base station may receive the information of the mobile network signal and the position determination information from the terminal and thus may acquire information required for optimization of the mobile network.

In an implementation process, it is found that the related art at least has the following problem:

based on the abovementioned processing manner, the terminal is required to make measurement for information of BT devices or Wi-Fi devices generating all the BT signals or Wi-Fi signals around, resulting in higher power consumption of the terminal.

SUMMARY

For solving the problem of high power consumption of a terminal in the related art, the present disclosure provides a method, device and system for MDT measurement. The technical solutions are implemented as follows.

According to a first aspect of embodiments of the present disclosure, a method for MDT measurement is provided, which may include that:

an identifier of a target network environment to be measured is determined, the target network environment corresponding to a target terminal device;

MDT configuration information is sent to the target terminal device, the MDT configuration information including the identifier of the target network environment; and measurement information of the target network environment is received from the target terminal device, the measurement information of the target network environment being associated with mobile network signal information of the target terminal device.

Optionally, the target network environment may include a target BT network environment and/or a target Wi-Fi network environment.

Optionally, when the target network environment includes the target Wi-Fi network environment, the identifier of the target network environment may include a service set identifier (SSID) of the target Wi-Fi network environment; or when the target network environment includes the target BT network environment, the identifier of the target network environment may include a name of the target BT network environment.

In such a manner, a data volume of the MDT configuration information may be reduced, so that the transmission efficiency of the MDT configuration information may be improved, and meanwhile, the probability of transmission failure may also be reduced.

Optionally, the MDT configuration information may be carried in LoggedMeasurementConfiguration signaling; or, the MDT configuration information may be carried in radio resource control (RRC) ConnectionReconfiguration signaling.

In such a manner, a base station, when sending other MDT configuration information to the target terminal device through LoggedMeasurementConfiguration signaling or RRCConnectionReconfiguration signaling, may send the identifier of the target network environment to the target terminal device, so that the number of times of sending signaling to the target terminal device may be reduced, and resource waste may further be prevented.

According to a second aspect of the embodiments of the present disclosure, an method for MDT measurement is provided, which may include that:

MDT configuration information sent by a base station is received, the MDT configuration information including an identifier of a target network environment;

information of the target network environment is measured according to the identifier of the target network environment to obtain measurement information of the target network environment; and the measurement information of the target network environment is sent to the base station.

Optionally, the target network environment may include a target BT network environment and/or a target Wi-Fi network environment.

Optionally, when the target network environment includes the target Wi-Fi network environment, the identifier of the target network environment may include an SSID of the target Wi-Fi network environment; or when the target network environment includes the target BT network environment, the identifier of the target network environment may include a name of the target BT network environment.

In such a manner, a data volume of the MDT configuration information may be reduced, so that the transmission efficiency of the MDT configuration information may be improved, and meanwhile, the probability of transmission failure may also be reduced.

Optionally, there may be a plurality of identifiers of the target network environments; and the operation that measurement is made for the information of the target network environment according to the identifier of the target network environment to obtain the measurement information of the target network environment may include that:

signal strengths of the target network environments is measured according to the plurality of identifiers of the target network environments, and an identifier of the target network environment, which corresponds to a maximum measured signal strength, is determined as the measurement information of the target network environments.

In such a manner, a data volume of data sent to the base station may be reduced, so that the transmission efficiency of the measurement information may be improved, and meanwhile, the probability of transmission failure may also be reduced.

Optionally, there may be one or more identifiers of the target network environment, and the target network environment may correspond to a plurality of network devices; and the operation that measurement is made for the information of the target network environment according to the identifier of the target network environment to obtain the measurement information of the target network environment may include that:

one or more signal strengths of the target network environments is or are measured according to the one or more identifiers of the target network environments, and an identifier of a network device with a maximum signal strength is determined as the measurement information of the target network environments.

In such a manner, the data volume of the data sent to the base station may be reduced, so that the transmission efficiency of the measurement information may be improved, and meanwhile, the probability of transmission failure may also be reduced.

Optionally, the MDT configuration information may be carried in LoggedMeasurementConfiguration signaling; or, the MDT configuration information may be carried in RRCConnectionReconfiguration signaling.

In such a manner, the base station, when sending other MDT configuration information to a target terminal device through LoggedMeasurementConfiguration signaling or RRCConnectionReconfiguration signaling, may send the identifier of the target network environment to the target terminal device, so that the number of times of sending signaling to the target terminal device may be reduced, and resource waste may further be prevented.

According to a third aspect of the embodiments of the present disclosure, a device for MDT measurement is provided, which may be a base station and may include:

a determination module, configured to determine an identifier of a target network environment to be measured, the target network environment corresponding to a target terminal device;

a sending module, configured to send MDT configuration information to the target terminal device, the MDT configuration information including the identifier of the target network environment; and a receiving module, configured to receive measurement information of the target network environment from the target terminal device, the measurement information of the target network environment being associated with mobile network signal information of the target terminal device.

Optionally, the target network environment may include a target BT network environment and/or a target Wi-Fi network environment.

Optionally, when the target network environment includes the target Wi-Fi network environment, the identifier of the target network environment may include an SSID of the target Wi-Fi network environment; or when the target network environment includes the target BT network environment, the identifier of the target network environment may include a name of the target BT network environment.

Optionally, the MDT configuration information may be carried in LoggedMeasurementConfiguration signaling; or, the MDT configuration information may be carried in RRCConnectionReconfiguration signaling.

According to a fourth aspect of the embodiments of the present disclosure, a device for MDT measurement is provided, which may be a target terminal device and may include:

a receiving module, configured to receive MDT configuration information from a base station, the MDT configuration information including an identifier of a target network environment;

a measurement module, configured to make measurement for information of the target network environment according to the identifier of the target network environment to obtain measurement information of the target network environment; and a sending module, configured to send the measurement information of the target network environment to the base station.

Optionally, the target network environment may include a target BT network environment and/or a target Wi-Fi network environment.

Optionally, when the target network environment includes the target Wi-Fi network environment, the identifier of the target network environment may include an SSID of the target Wi-Fi network environment; or when the target network environment includes the target BT network environment, the identifier of the target network environment may include a name of the target BT network environment.

Optionally, there may be a plurality of identifiers of the target network environments; and the measurement module may be configured to:

measure signal strengths of the target network environments according to the plurality of identifiers of the target network environments and determine an identifier of the target network environment, which corresponds to a maximum measured signal strength, as the measurement information of the target network environments.

Optionally, there may be one or more identifiers of the target network environment, and the target network environment may correspond to a plurality of network devices; and the measurement module may be configured to:

measure one or more signal strengths of the target network environments according to the one or more identifiers of the target network environments, and determine an identifier of a network device with a maximum signal strength as the measurement information of the target network environments.

Optionally, the MDT configuration information may be carried in LoggedMeasurementConfiguration signaling; or, the MDT configuration information may be carried in RRCConnectionReconfiguration signaling.

According to a fifth aspect of the embodiments of the present disclosure, a base station is provided, which may include a processor and a memory, wherein at least one instruction, at least one segment of program, a code set or an instruction set may be stored in the memory, and the at least one instruction, the at least one segment of program, the code set or the instruction set may be loaded and executed by the processor to implement the method for MDT measurement of the first aspect.

According to a sixth aspect of the embodiments of the present disclosure, a target terminal device is provided, which may include a processor and a memory, wherein at least one instruction, at least one segment of program, a code set or an instruction set may be stored in the memory, and the at least one instruction, the at least one segment of program, the code set or the instruction set may be loaded and executed by the processor to implement the method for MDT measurement of the second aspect.

According to a seventh aspect of the embodiments of the present disclosure, a computer-readable storage medium is provided, in which at least one instruction, at least one segment of program, a code set or an instruction set may be stored, the at least one instruction, the at least one segment of program, the code set or the instruction set being loaded and executed by a processor to implement the method for MDT measurement of the first aspect or the method for MDT measurement of the second aspect.

According to an eighth aspect of the embodiments of the present disclosure, an MDT measurement system is provided, which may include a base station and a target terminal device, wherein the base station may be the base station of the third aspect or the fifth aspect; and the target terminal device may be the target terminal device of the fourth aspect or the sixth aspect.

The technical solutions provided by the embodiments of the present disclosure have the following beneficial effects.

In the embodiments of the present disclosure, a base station, before sending MDT configuration information to a target terminal device, may determine an identifier of a target network environment to be measured corresponding to the target terminal device and may further send the MDT configuration information including the identifier of the target network environment to the target terminal device, and the target terminal device, after receiving the MDT configuration information from the base station, may measure the information of the target network environment according to the identifier of the target network environment and send the measurement information of the target network environment to the base station. The measurement information of the target network environment may be associated with the mobile network signal information of the target terminal device. In such a manner, the target terminal device may measure the information of the target network environment only, namely information of a network device (for example, a Wi-Fi device or a BT device) in the target network environment only may be measured, and it is unnecessary to make measurement for information of network devices in all network environments, so that the power consumption of the terminal may be reduced.

BRIEF DESCRIPTION OF THE DRAWINGS

In order to describe the technical solutions in the embodiments of the present disclosure more clearly, the accompanying drawings required to be used for descriptions about the embodiments will be simply introduced below. It is apparent that the accompanying drawings described below are only some embodiments of the present disclosure. Those of ordinary skill in the art may further obtain other accompanying drawings according to these accompanying drawings without creative work.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figures 1, 2:
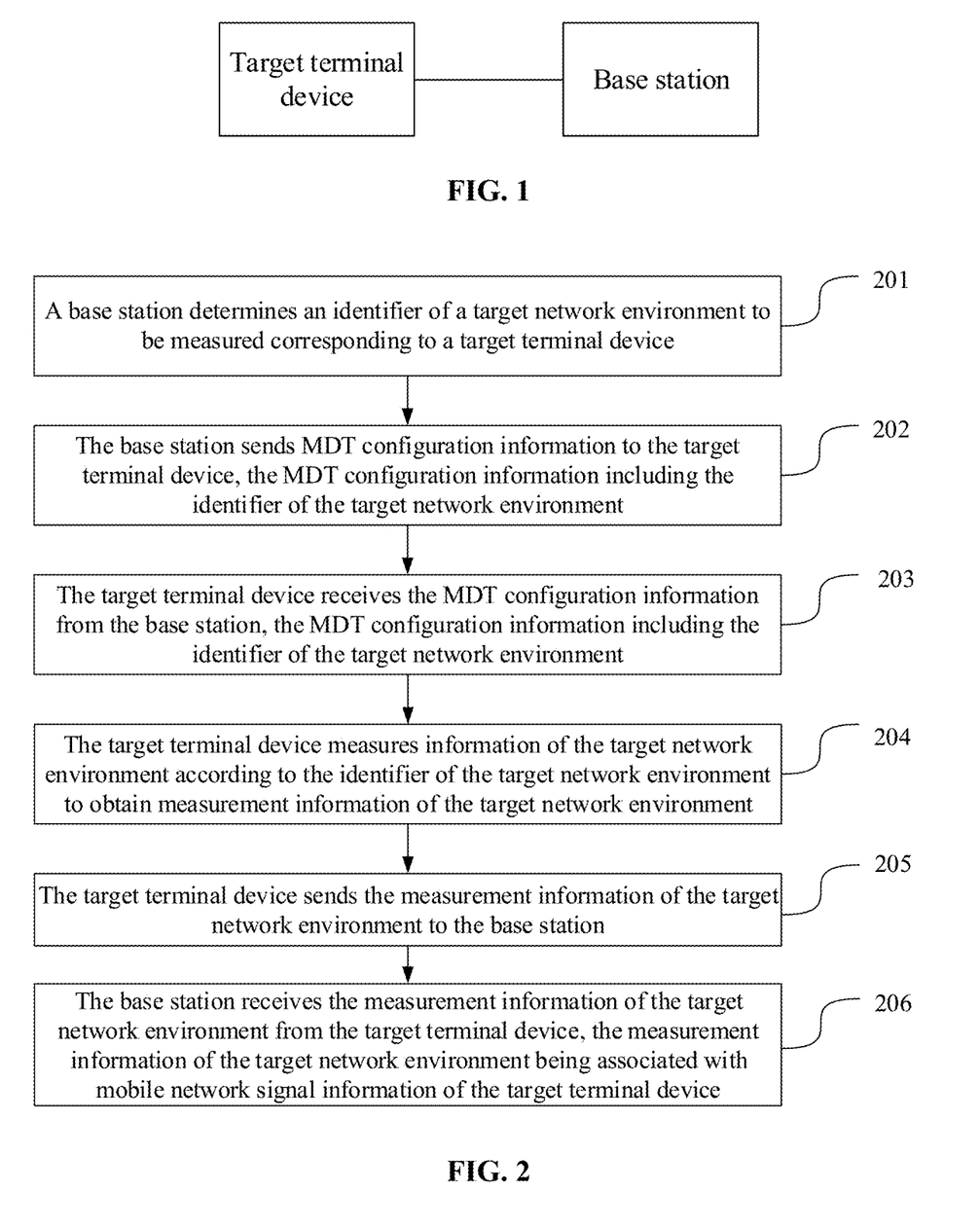
FIG. 1 is a structure diagram of a system according to an embodiment of the present disclosure.
FIG. 2 is a flow chart showing a method for MDT measurement according to an embodiment of the present disclosure.

An exemplary embodiment of the present disclosure provides a method for MDT measurement. The method may be implemented by a base station and a target terminal device together. A structure diagram of a system is shown in FIG. 1. The base station may be a base station in a wireless communication system. For example, it may be a Base Transceiver Station (BTS) in a Global System for Mobile communications (GSM) or Code Division Multiple Access (CDMA), may also be a NodeB (NB) in Wideband Code Division Multiple Access (WCDMA) and may also be an Evolutional Node B (eNB or e-NodeB) in Long Term Evolution (LTE). The target terminal device may also be called User Equipment (UE), a Mobile Station (MS), a mobile terminal and the like. For example, the target terminal device may be a mobile phone (or called a cell phone). For example, the target terminal device may also be a portable, pocket, handheld, computer-embedded or vehicle-mounted mobile device, and exchanges languages and/or data with a radio access network. After the base station sends MDT configuration information including an identifier of a target network environment to the target terminal device, the target terminal device may make measurement for information of the target network environment only to obtain measurement information of the target network environment and send the measurement information of the target network environment to the base station.

The base station may include parts such as a processor, a memory and a transceiver. The processor may be a Central Processing Unit (CPU) and the like, and may be configured for related processing of determining an identifier of a target network environment to be measured corresponding to the target terminal device. The memory may be a Random Access Memory (RAM), a flash and the like, and may be configured to store received data, data required in a processing process, data generated in the processing process and the like, for example, the identifier of the target network environment and the measurement information of the target network environment. The transceiver may be configured to perform data transmission with the target terminal device or another device (for example, a server of an operating company), for example, sending MDT configuration information including the identifier of the target network environment to the target terminal device and receiving the measurement information of the target network environment from the target terminal device. The transceiver may include an antenna, a matching circuit, a modem and the like.

The target terminal device may include parts such as a processor, a memory and a transceiver. The processor may be a CPU and the like, and may be configured for related processing of making measurement for information of a target network environment according to an identifier of the target network environment. The memory may be a RAM, a flash and the like, and may be configured to store received data, data required in a processing process, data generated in the processing process and the like, for example, MDT configuration information including the identifier of the target network environment. The transceiver may be configured to perform data transmission with another device, for example, receiving the MDT configuration information including the identifier of the target network environment from the base station and sending the measurement information of the target network environment to the base station. The transceiver may include an antenna, a matching circuit, a modem and the like.

A processing flow shown in FIG. 2 will be described below in combination with an implementation mode in detail. Contents may be as follows.

In operation 201, a base station determines an identifier of a target network environment to be measured corresponding to a target terminal device.

The target terminal device may be any terminal that MDT configuration information is to be configured for.

During implementation, for optimizing a mobile network (or called a cellular network), related information required for optimization of the mobile network is usually acquired through an MDT technology. Specifically, for the target terminal device that the MDT configuration information is to be configured for, the base station may determine an activity region corresponding to the target terminal device and may further determine an identifier of a network environment with a signal covering the activity region as the identifier of the target network environment to be measured corresponding to the target terminal device. Identifiers of the target network environment corresponding to different target terminal devices may be the same or different. Or, the base station, after determining the activity region corresponding to the target terminal device, may determine an identifier of a network environment where a network device (the network device may be a device generating a signal corresponding to the network environment, for example, a BT device and/or a Wi-Fi device) is deployed in the activity region as the identifier of the target network environment to be measured corresponding to the target terminal device.

Optionally, the target network environment may be a target wireless network environment, such as a target BT network environment, or a target Wi-Fi network environment, or a target BT network environment and a target Wi-Fi network environment.

Optionally, for different target network environments, different identifiers may correspond to the different target network environments. Correspondingly, when the target network environments include a target Wi-Fi network environment, the identifiers of the target network environments may include an SSID of the target Wi-Fi network environment; or when the target network environments include a target BT network environment, the identifiers of the target network environments may include a name of the target BT network environment.

During implementation, when the target network environment is the target Wi-Fi network environment, the identifier of the target network environment may be the SSID of the target Wi-Fi network environment. For example, the SSID of the target Wi-Fi network environment is "China Mobile". When the target network environment is the target BT network environment, the identifier of the target network environment may be the name of the target BT network environment, and the name of the target BT network environment may be a name of a corresponding BT signal. For example, the name of the target BT network environment is "mobile BT". When the target network environment is the target Wi-Fi network environment and the target BT network environment, the identifiers of the target network environment may be the SSID of the target Wi-Fi network environment and the name of the target BT network environment.

In operation 202, the base station sends MDT configuration information to the target terminal device, the MDT configuration information including the identifier of the target network environment.

Figure 3:
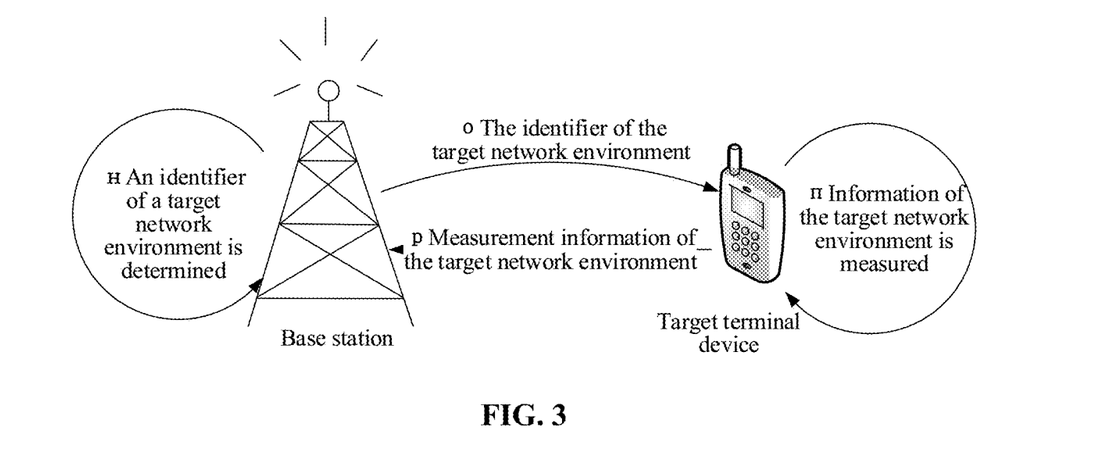
FIG. 3 is a structure diagram of a system according to an embodiment of the present disclosure.

During implementation, the base station, after determining the identifier of the target network environment to be measured corresponding to the target terminal device, may send the MDT configuration information including the identifier of the target network environment to the target terminal device, as shown in FIG. 3. That is, the base station, when sending the MDT configuration information to the target terminal device, may configure the identifier of the target network environment to be measured for the target terminal device. The MDT configuration information may further include another parameter for MDT measurement of the target terminal device.

Optionally, the base station may make different types of MDT configurations for the target terminal device. When different types of MDT configurations are made, the MDT configuration information may be carried in different signaling, namely the MDT configuration information may be carried in LoggedMeasurementConfiguration signaling, or, the MDT configuration information may be carried in RRC-ConnectionReconfiguration signaling.

During implementation, in the MDT technology, the base station may make different types of MDT configurations for the target terminal device. Logged MDT configuration may be performed. Real-time MDT configuration may be performed. When the base station makes logged MDT configuration for the target terminal device, the base station may send the MDT configuration information including the identifier of the target network environment to the target terminal device through the LoggedMeasurementConfiguration signaling, namely the MDT configuration information may be carried in the LoggedMeasurementConfiguration signaling. When the base station makes real-time MDT configuration for the target terminal device, the base station may send the MDT configuration information including the identifier of the target network environment to the target terminal device through the RRCConnectionReconfiguration signaling.

In operation 203, the target terminal device receives the MDT configuration information from the base station, the MDT configuration information including the identifier of the target network environment.

During implementation, after the base station sends the MDT configuration information including the identifier of the target network environment to the target terminal device, the target terminal device may receive the MDT configuration information from the base station.

Optionally, the target network environment may be a target wireless network environment. For example, it may be a target BT network environment, or a target Wi-Fi network environment, or a target BT network environment and a target Wi-Fi network environment.

Optionally, for different target network environments, different identifiers may correspond to the different target network environments. Correspondingly, when the target network environments include a target Wi-Fi network environment, the identifiers of the target network environments may include the SSID of the target Wi-Fi network environment; or when the target network environments include a target BT network environment, the identifiers of the target network environments may include the name of the target BT network environment.

During implementation, when the target network environment is a target Wi-Fi network environment, the identifier of the target network environment may be the SSID of the target Wi-Fi network environment. For example, the SSID of the target Wi-Fi network environment is "China Mobile". When the target network environment is a target BT network environment, the identifier of the target network environment may be the name of the target BT network environment, and the name of the target BT network environment may be the name of a corresponding BT signal. For example, the name of the target BT network environment is "mobile BT". When the target network environment is the target Wi-Fi network environment and the target BT network environment, the identifiers of the target network environment may be the SSID of the target Wi-Fi network environment and the name of the target BT network environment.

Optionally, the base station may make different types of MDT configurations for the target terminal device. When different types of MDT configurations are made, the MDT configuration information may be carried in different signaling, namely the MDT configuration information may be carried in the LoggedMeasurementConfiguration signaling, or, the MDT configuration information may be carried in the RRCConnectionReconfiguration signaling.

During implementation, in the MDT technology, the base station may make different types of MDT configurations for the target terminal device. Logged MDT configuration may be made. Real-time MDT configuration may be made. When the base station performs logged MDT configuration on the target terminal device, the base station may send the MDT configuration information including the identifier of the target network environment to the target terminal device through the LoggedMeasurementConfiguration signaling, and correspondingly, the target terminal device may receive the LoggedMeasurementConfiguration signaling from the base station and may further parse the received LoggedMeasurementConfiguration signaling to acquire the MDT configuration information included therein. When the base station performs real-time MDT configuration on the target terminal device, the base station may send the MDT configuration information including the identifier of the target network environment to the target terminal device through the RRCConnectionReconfiguration signaling, and correspondingly, the target terminal device may receive the RRCConnectionReconfiguration signaling from the base station and may further parse it to acquire the MDT configuration information included therein.

In operation 204, the target terminal device makes measurement for information of the target network environment according to the identifier of the target network environment to obtain measurement information of the target network environment.

The measurement information of the target network environment may be information configured for the base station to determine a present position of the target terminal device.

During implementation, the target terminal device, after receiving the MDT configuration information including the identifier of the target network environment, may only make measurement for the information of the target network environment with a signal covering the present position of the target terminal device according to the identifier of the target network environment to obtain the measurement information of the target network environment and does not makes measurement for information of another network environment. The target terminal device, after receiving the MDT configuration information including the identifier of the target network environment, may make measurement for the information of the target network environment and may also make measurement for mobile network signal information. The target terminal device may simultaneously make measurement for the information of the target network environment and the mobile network signal information. Or, the target terminal device may make measurement for the mobile network signal information, and then, when detecting that a mobile network signal is weak, make measurement for the information of the target network environment. There are no limits made thereto in the embodiments of the present disclosure.

Optionally, based on obtained different pieces of measurement information of the target network environment, various processing manners may be adopted for the operation 204. The following feasible processing manners are presented.

A first manner may be that: there are a plurality of identifiers of the target network environments; signal strengths of the target network environments are measured according to the plurality of identifiers of the target network environments; and an identifier of a target network environment providing a maximum measured signal strength is determined as the measurement information of the target network environments.

During implementation, the target terminal device may correspond to multiple identifiers of the target network environments to be measured, for example, identifiers of respective network environments with a signal covering the activity region corresponding to the target terminal device or identifiers of respective network environments where a corresponding network device is deployed in the activity region corresponding to the target terminal device. Under this condition, the target terminal device, after receiving the MDT configuration information, may determine the identifiers of the target network environments from the identifiers of respective detected network environment and may further measure the signal strengths of the target network environments according to the determined identifiers of the target network environments. Then, a maximum signal strength may be determined from measured signal strengths, and furthermore, an identifier of a target network environment corresponding to the maximum signal strength may be determined as the measurement information of the target network environments. In addition, if the identifier of only one target network environment is determined from the detected identifiers of respective network environments, the target terminal device may directly determine the determined identifier of the target network environment as the measurement information of the target network environments, namely if the identifiers of respective detected network environments only includes the identifier of one target network environment, the target terminal device may determine the determined identifier of the one target network environment as the measurement information of the target network environment. Under this condition, a processing process of the first manner may be as follows: if the identifiers of respective detected network environments include identifiers of multiple target network environments, the signal strengths of the target network environments may be measured according to the identifiers of the target network environments; and an identifier of a target network environment corresponding to a maximum measured signal strength is determined as the measurement information of the target network environments.

A second manner may be that: there is one or more identifiers of the target network environment, and the target network environment corresponds to a plurality of network devices; one or more signal strengths of the target network environments is or are measured according to the one or more identifiers of the target network environments; and an identifier of a network device with a maximum signal strength is determined as the measurement information of the target network environments.

During implementation, the target network environment may correspond to a plurality of network devices. The target network environment may have one identifier, and the target network environment may correspond to multiple network devices. Or, there are a plurality of identifiers of the target network environments, and each target network environment may correspond to one or more network devices. Under this condition, the target terminal device, after receiving the MDT configuration information, may determine the identifiers of the target network environments from the detected identifiers of respective network environments and may further measure the signal strengths of the target network environments according to the determined identifiers of the target network environments. Then, a maximum signal strength may be determined from the measured signal strengths, and the target terminal device may further determine an identifier of a network device (for example, a Media Access Control (MAC) address of the network device) providing the maximum signal strength, namely the identifier of the network device closest to the target terminal device may be determined. The identifier of the network device may be determined as the measurement information of the target network environments.

In addition, for the conditions of the first manner and the second manner, the target terminal device may further determine the maximum signal strength as the measurement information of the target network environment.

In operation 205, the target terminal device sends the measurement information of the target network environment to the base station.

During implementation, the target terminal device, after obtaining the measurement information of the target network environment, may send the measurement information of the target network environment to the base station. In addition, in the condition that the target terminal device receives the MDT configuration information and measures the mobile network signal information, the target terminal device, after making measurement for the mobile network signal information, may send the mobile network signal information to the base station. The target terminal device may simultaneously send the mobile network signal information and the measurement information of the target network environment to the base station, or may send the mobile network signal information and the measurement information of the target network environment to the base station respectively.

In operation 206, the base station receives the measurement information of the target network environment from the target terminal device, the measurement information of the target network environment being associated with mobile network signal information of the target terminal device.

During implementation, after the target terminal device sends the measurement information of the target network environment to the base station, the base station may receive the measurement information of the target network environment from the target terminal device. In addition, for the condition that the target terminal device sends the mobile network signal information to the base station, the base station may correspondingly receive the mobile network signal information from the target terminal device. The measurement information of the target network environment may be associated with the mobile network signal information of the target terminal device.

In addition, the base station, after receiving the measurement information of the target network environment from the target terminal device, may determine the present position of the target terminal device according to the measurement information of the target network environment. Specifically, for the first manner, the base station may pre-store a corresponding relationship between an identifier of each network environment and a geographical position. The base station, after receiving the identifier of the target network environment with a maximum signal strength from the target terminal device, may determine a geographical position corresponding to the identifier, sent by the target terminal device, of the target network environment from the corresponding relationship and may further determine the geographical position as the present position of the target terminal device. Specifically, for the second manner, the base station may pre-store a corresponding relationship between an identifier of each network device and a geographical position. The base station, after receiving an identifier of a network device with a maximum signal strength from the target terminal device, may determine a geographical position corresponding to the identifier, sent by the target terminal device, of the network device from the corresponding relationship and may further determine the geographical position as the present position of the target terminal device.

In the embodiments of the present disclosure, the base station, before sending MDT configuration information to the target terminal device, may determine an identifier of a target network environment to be measured corresponding to the target terminal device and may further send the MDT configuration information including the identifier of the target network environment to the target terminal device. Correspondingly, the target terminal device, after receiving the MDT configuration information from the base station, may make measurement for information of the target network environment according to the identifier of the target network environment and send the measurement information of the target network environment to the base station, the measurement information of the target network environment being associated with mobile network signal information of the target terminal device. In such a manner, the target terminal device may make measurement for the information of the target network environment only, namely, making measurement for information of a network device (for example, a Wi-Fi device or a BT device) in the target network environment only. It is unnecessary to make measurement for information of network devices in all network environments, so that the power consumption of the terminal may be reduced.

Figure 4:
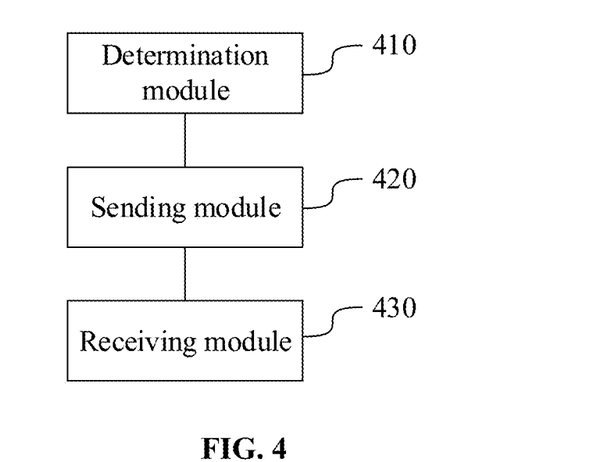
FIG. 4 is a structure diagram of a device for MDT measurement according to an embodiment of the present disclosure.

Based on the same technical concept, another exemplary embodiment of the present disclosure provides a device for MDT measurement. The device may be the abovementioned base station. As shown in FIG. 4, the device includes:

a determination module 410, configured to determine an identifier of a target network environment to be measured, the target network environment corresponding to a target terminal device;

a sending module 420, configured to send MDT configuration information to the target terminal device, the MDT configuration information including the identifier of the target network environment; and a receiving module 430, configured to receive measurement information of the target network environment from the target terminal device, the measurement information of the target network environment being associated with mobile network signal information of the target terminal device.

Optionally, the target network environment may include a target BT network environment and/or a target Wi-Fi network environment.

Optionally, when the target network environment includes the target Wi-Fi network environment, the identifier of the target network environment may include an SSID of the target Wi-Fi network environment; or when the target network environment includes the target BT network environment, the identifier of the target network environment may include a name of the target BT network environment.

Optionally, the MDT configuration information may be carried in LoggedMeasurementConfiguration signaling; or, the MDT configuration information may be carried in RRCConnectionReconfiguration signaling.

Figure 5:
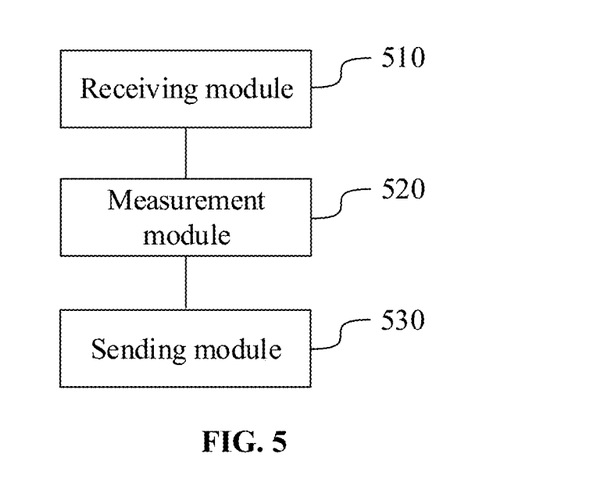
FIG. 5 is a structure diagram of a device for MDT measurement according to an embodiment of the present disclosure.

Based on the same technical concept, another exemplary embodiment of the present disclosure provides a device for MDT measurement. The device may be the abovementioned target terminal device. As shown in FIG. 5, the device includes:

a receiving module 510, configured to receive MDT configuration information from a base station, the MDT configuration information including an identifier of a target network environment;

a measurement module 520, configured to make measurement for information of the target network environment according to the identifier of the target network environment to obtain measurement information of the target network environment; and a sending module 530, configured to send the measurement information of the target network environment to the base station.

Optionally, the target network environment may include a target BT network environment and/or a target Wi-Fi network environment.

Optionally, when the target network environment includes the target Wi-Fi network environment, the identifier of the target network environment may include an SSID of the target Wi-Fi network environment; or when the target network environment includes the target BT network environment, the identifier of the target network environment may include a name of the target BT network environment.

Optionally, there may be a plurality of identifiers of the target network environments; and the measurement module 520 is configured to:

measure signal strengths of the target network environments according to the plurality of identifiers of the target network environments and determine an identifier of a target network environment which provides a maximum measured signal strength as the measurement information of the target network environments.

Optionally, there may be one or more identifiers of the target network environment, and the target network environment may correspond to a plurality of network devices; and the measurement module 520 is configured to:

measure one or more signal strengths of the target network environment according to the one or more identifiers of the target network environment; and determine an identifier of a network device with a maximum signal strength as the measurement information of the target network environment.

Optionally, the MDT configuration information may be carried in LoggedMeasurementConfiguration signaling; or, the MDT configuration information may be carried in RRCConnectionReconfiguration signaling.

In the embodiments of the present disclosure, the base station, before sending MDT configuration information to the target terminal device, may determine an identifier of a target network environment to be measured corresponding to the target terminal device and may further send the MDT configuration information including the identifier of the target network environment to the target terminal device. Correspondingly, the target terminal device, after receiving the MDT configuration information from the base station, may measure the information of the target network environment according to the identifier of the target network environment and send the measurement information of the target network environment to the base station, the measurement information of the target network environment being associated with the mobile network signal information of the target terminal device. In such a manner, the target terminal device may make measurement for the information of the target network environment only, namely making measurement for information of a network device (for example, a Wi-Fi device or a BT device) in the target network environment only. It is unnecessary to make measurement for information of network devices in all network environments, so that the power consumption of the terminal may be reduced.

It is to be noted that: when MDT measurement is performed, the device for MDT measurement provided in the abovementioned embodiment is described with division of each abovementioned functional module as an example only. During a practical application, the abovementioned functions may be allocated to different functional modules for realization according to a requirement, that is, internal structures of a base station and a target terminal device may be divided into different functional modules to realize all or part of the functions described above. In addition, the device for MDT measurement provided in the abovementioned embodiment belongs to the same concept of the embodiments of the methods for MDT measurement, details about its specific implementation process refer to the method embodiment, and elaborations are omitted herein.

Based on the same technical concept, another exemplary embodiment of the present disclosure provides a system for MDT measurement, which includes a base station and a target terminal device.

The base station is configured to determine an identifier of a target network environment to be measured corresponding to the target terminal device, send MDT configuration information to the target terminal device, the MDT configuration information including the identifier of the target network environment, and receive measurement information of the target network environment from the target terminal device, the measurement information of the target network environment being associated with mobile network signal information of the target terminal device.

The target terminal device is configured to receive the MDT configuration information from the base station, make measurement for information of the target network environment according to the identifier of the target network environment to obtain the measurement information of the target network environment and send the measurement information of the target network environment to the base station.

In the embodiments of the present disclosure, the base station, before sending MDT configuration information to the target terminal device, may determine an identifier of a target network environment to be measured corresponding to the target terminal device and may further send the MDT configuration information including the identifier of the target network environment to the target terminal device. Correspondingly, the target terminal device, after receiving the MDT configuration information from the base station, may measure the information of the target network environment according to the identifier of the target network environment and send the measurement information of the target network environment to the base station, the measurement information of the target network environment being associated with the mobile network signal information of the target terminal device. In such a manner, the target terminal device may measure the information of the target network environment only, namely making measurement for information of a network device (for example, a Wi-Fi device or a BT device) in the target network environment only. It is unnecessary to make measurement for information of network devices in all network environments, so that the power consumption of the terminal may be reduced.

Figure 6:
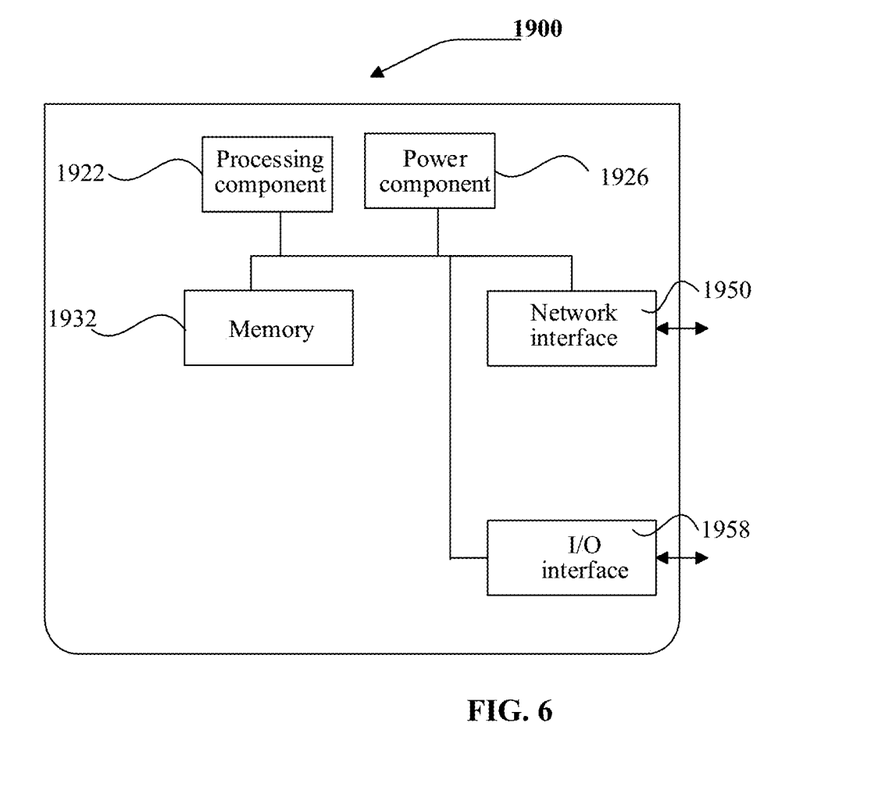
FIG. 6 is a device structure diagram of a base station according to an embodiment of the present disclosure.

FIG. 6 is a block diagram of a device 1900 for MDT measurement according to an exemplary embodiment. For example, the device 1900 may be provided as a base station. Referring to FIG. 6, the device 1900 includes a processing component 1922 which further including one or more processors, and a memory resource represented by a memory 1932 configured to store instructions executable by the processing component 1922, for example, an application program. The application program stored in the memory 1932 may include one or more than one module of which each corresponds to a set of instructions. In addition, the processing component 1922 is configured to execute the instruction to execute the method for MDT measurement.

The device 1900 may further include a power component 1926 configured to execute power management of the device 1900, a wired or wireless network interface 1950 configured to connect the device 1900 to a network and an Input/Output (I/O) interface 1958. The device 1900 may be operated based on an operating system stored in the memory 1932, for example, Windows Server™, Mac OS X™, Unix™, Linux™, FreeBSD™ or the like.

The device 1900 may include a memory and one or more than one program. The one or more than one program may be stored in the memory and configured to be executed by one or more than one processor. The one or more than one program may include instructions configured to execute the following operations:

determining an identifier of a target network environment to be measured corresponding to a target terminal device;

sending MDT configuration information to the target terminal device, the MDT configuration information including the identifier of the target network environment; and receiving measurement information of the target network environment from the target terminal device, the measurement information of the target network environment being associated with mobile network signal information of the target terminal device.

Optionally, the target network environment may include a target BT network environment and/or a target Wi-Fi network environment.

Optionally, when the target network environment includes the target Wi-Fi network environment, the identifier of the target network environment may include an SSID of the target Wi-Fi network environment; or when the target network environment includes the target BT network environment, the identifier of the target network environment may include a name of the target BT network environment.

Optionally, the MDT configuration information may be carried in LoggedMeasurementConfiguration signaling; or, the MDT configuration information may be carried in RRCConnectionReconfiguration signaling.

There is also provided a non-transitory computer-readable storage medium in an exemplary embodiment. At least one instruction, at least one segment of program, a code set or an instruction set may be stored in the storage medium, and the at least one instruction, the at least one segment of program, the code set or the instruction set may be loaded and executed by a processor to implement the method for MDT measurement.

In the embodiments of the present disclosure, the base station, before sending MDT configuration information to the target terminal device, may determine an identifier of a target network environment to be measured corresponding to the target terminal device and may further send the MDT configuration information including the identifier of the target network environment to the target terminal device. Correspondingly, the target terminal device, after receiving the MDT configuration information from the base station, may measure the information of the target network environment according to the identifier of the target network environment and send the measurement information of the target network environment to the base station, the measurement information of the target network environment being associated with the mobile network signal information of the target terminal device. In such a manner, the target terminal device may measure the information of the target network environment only, namely making measurement information of a network device (for example, a Wi-Fi device or a BT device) in the target network environment only. It is unnecessary to make measurement for information of network devices in all network environments, so that the power consumption of the terminal may be reduced.

Figure 7:
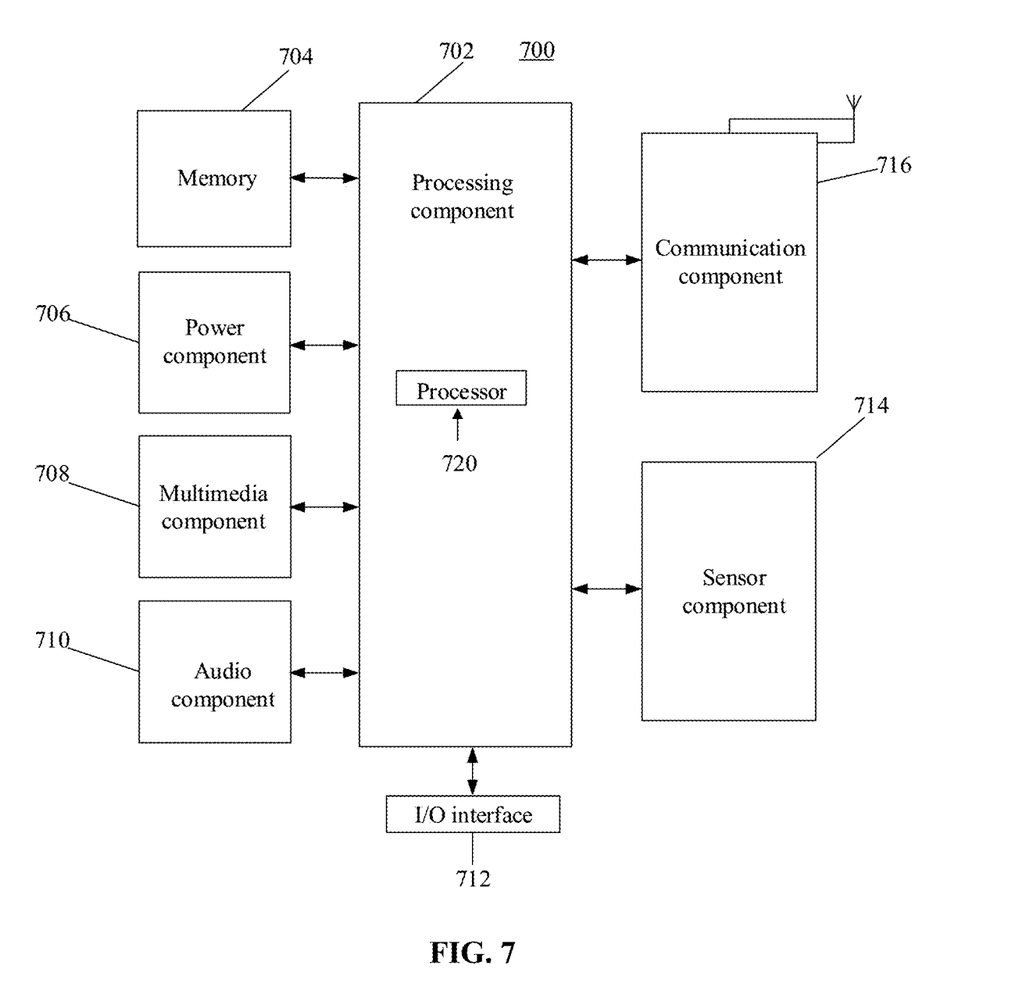
FIG. 7 is a device structure diagram of a target terminal device according to an embodiment of the present disclosure.

A structure diagram of a terminal according to an embodiment of the present disclosure is also shown. The terminal may be the abovementioned target terminal device, and for example, may be a mobile phone and a tablet computer.

Referring to FIG. 7, the terminal 700 may include one or more of the following components: a processing component 702, a memory 704, a power component 706, a multimedia component 708, an audio component 710, an I/O interface 712, a sensor component 714, and a communication component 716.

The processing component 702 is typically configured to control overall operations of the terminal 700, such as the operations associated with display, telephone calls, data communications, camera operations, and recording operations. The processing component 702 may include one or more processors 720 to execute instructions to perform all or part of the operations in the abovementioned method. Moreover, the processing component 702 may include one or more modules which facilitate interaction between the processing component 702 and the other components. For instance, the processing component 702 may include a multimedia module to facilitate interaction between the multimedia component 708 and the processing component 702.

The memory 704 is configured to store various types of data to support the operation of the terminal 700. Examples of such data include instructions for any application programs or methods operated on the terminal 700, contact data, phonebook data, messages, pictures, video, etc. The memory 704 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 is configured to provide power for various components of the terminal 700. The power component 706 may include a power management system, one or more power supplies, and other components associated with generation, management and distribution of power for the audio output device 700.

The multimedia component 708 may include a screen providing an output interface between the terminal 700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 708 includes a front camera and/or a rear camera. The front camera and/or the rear camera may receive external multimedia data when the terminal 700 is in an operation mode, such as a photographing mode or a video mode. Each of the front camera and the rear camera may be a fixed optical lens system or have focusing and optical zooming capabilities.

The audio component 710 is configured to output and/or input an audio signal. For example, the audio component 710 includes a Microphone (MIC), and the MIC is configured to receive an external audio signal when the audio output device 700 is in the operation mode, such as a call mode, a recording mode and a voice recognition mode. The received audio signal may further be stored in the memory 704 or sent through the communication component 716.

The I/O interface 712 may provide an interface between the processing component 702 and a peripheral interface module, and the peripheral interface module may be a keyboard, a click wheel, a button and the like. The button may include, but not limited to: a home button, a volume button, a starting button and a locking button.

The sensor component 714 may include one or more sensors configured to provide status assessment in various aspects for the terminal 700. For instance, the sensor component 714 may detect an on/off status of the terminal 700 and relative positioning of components, such as a display and small keyboard of the terminal 700, and the sensor component 714 may further detect a change in a position of the terminal 700 or a component of the terminal 700, presence or absence of contact between the user and the terminal 700, orientation or acceleration/deceleration of the terminal 700 and a change in temperature of the terminal 700. The sensor component 714 may include a proximity sensor configured to detect presence of an object nearby without any physical contact. The sensor component 714 may also include a light sensor, such as a Complementary Metal Oxide Semiconductor (CMOS) or Charge Coupled Device (CCD) image sensor, configured for use in an imaging application. In some embodiments, the sensor component 714 may also include an acceleration sensor, a gyroscope sensor, a magnetic sensor, a pressure sensor or a temperature sensor.

The communication component 716 is configured to facilitate wired or wireless communication between the terminal 700 and another device. The terminal 700 may access a communication-standard-based wireless network, such as a Wi-Fi network, a 2nd-Generation (2G) or 3rd-Generation (3G) network or a combination thereof. In an exemplary embodiment, the communication component 716 receives a broadcast signal or broadcast associated information from an external broadcast management system through a broadcast channel. In an exemplary embodiment, the communication component 716 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a BT technology and another technology.

In an exemplary embodiment, the terminal 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 704 including instructions, and the instructions may be executed by the processor 720 of the terminal 700 to implement the abovementioned method. For example, the non-transitory computer-readable storage medium may be a ROM, a RAM, a Compact Disc Read-Only Memory (CD-ROM), a magnetic tape, a floppy disc, an optical data storage device and the like.

According to a non-transitory computer-readable storage medium, instructions in the storage medium may be executed by a processor of a terminal to enable the terminal to execute a method for MDT measurement, the method including:

receiving MDT configuration information from a base station is received, the MDT configuration information including an identifier of a target network environment;

making measurement for information of the target network environment according to the identifier of the target network environment to obtain measurement information of the target network environment; and sending the measurement information of the target network environment to the base station.

Optionally, the target network environment may include a target BT network environment and/or a target Wi-Fi network environment.

Optionally, when the target network environment includes the target Wi-Fi network environment, the identifier of the target network environment may include an SSID of the target Wi-Fi network environment; or when the target network environment includes the target BT network environment, the identifier of the target network environment may include a name of the target BT network environment.

Optionally, there may be a plurality of identifiers of the target network environments; and the operation that measurement is made for the information of the target network environment according to the identifier of the target network environment to obtain the measurement information of the target network environment may include that:

signal strengths of the target network environments are measured according to the plurality of identifiers of the target network environments, and an identifier of a target network environment which provides a maximum measured signal strength is determined as the measurement information of the target network environments.

Optionally, there may be one or more identifiers of the target network environment, and the target network environment may correspond to a plurality of network devices; and the operation that measurement is made for the information of the target network environment according to the identifier of the target network environment to obtain the measurement information of the target network environment may include that:

one or more signal strengths of the target network environments is or are measured according to the one or more identifiers of the target network environment, and an identifier of a network device with a maximum signal strength is determined as the measurement information of the target network environment.

Optionally, the MDT configuration information may be carried in LoggedMeasurementConfiguration signaling; or, the MDT configuration information may be carried in RRCConnectionReconfiguration signaling.

In the embodiments of the present disclosure, the base station, before sending MDT configuration information to the target terminal device, may determine an identifier of a target network environment to be measured corresponding to the target terminal device and may further send the MDT configuration information including the identifier of the target network environment to the target terminal device. Correspondingly, the target terminal device, after receiving the MDT configuration information from the base station, may measure the information of the target network environment according to the identifier of the target network environment and send the measurement information of the target network environment to the base station, the measurement information of the target network environment being associated with the mobile network signal information of the target terminal device. In such a manner, the target terminal device may measure the information of the target network environment only, namely making measurement for information of a network device (for example, a Wi-Fi device or a BT device) in the target network environment only. It is unnecessary to make measurement for information of network devices in all network environments, so that the power consumption of the terminal may be reduced.

Those of ordinary skill in the art should know that implementation of all or part of the operations of the abovementioned embodiments may be completed through hardware or may also be completed through related hardware instructed by a program. The program may be stored in a computer-readable storage medium. The storage medium may be a ROM, a magnetic disk, an optical disc or the like.

The above is only the preferred embodiments of the present disclosure and not intended to limit the present disclosure. Any modifications, equivalent replacements, improvements and the like made within the spirit and principle of the present disclosure shall fall within the scope of protection of the present disclosure.

The invention claimed is:

1. A method for minimization of drive tests (MDT) measurement, implemented by a base station, the method comprising:

determining an activity region corresponding to a target terminal device, and then determining an identifier of a network environment with a signal covering the activity region as an identifier of a target network environment to be measured corresponding to the target terminal device, wherein the target terminal device is a Bluetooth device or a wireless fidelity (Wi-Fi) device;

sending MDT configuration information to the target terminal device, the MDT configuration information comprising the identifier of the target network environment; and receiving measurement information of the target network environment and information of a mobile network signal of the target terminal device from the target terminal device, wherein the measurement information of the target network environment is associated with the information of the mobile network signal of the target terminal device, and the measurement information of the target network environment is obtained by making measurement for information of the target network environment by the target terminal device in response to the mobile network signal being weak, wherein there is one or more identifiers of the target network environment(s), and the target network environment(s) correspond(s) to a plurality of network devices, the plurality of network devices being at least one of Bluetooth devices or Wi-Fi devices for generating signals of corresponding network environment(s); and one or more signal strengths of the target network environment(s) is/are measured according to the one or more identifiers of the target network environment(s), and an identifier of a network device with a maximum signal strength is determined from the plurality of network devices as the measurement information of the target network environment(s).

2. The method of claim 1, wherein the target network environment(s) comprise(s) at least one of a target Bluetooth (BT) network environment or a target wireless fidelity (Wi-Fi) network environment.

3. The method of claim 2, wherein when the target network environment(s) comprise(s) the target Wi-Fi network environment, the identifier(s) of the target network environment(s) comprise(s) a service set identifier(s) (SSID(s)) of the target Wi-Fi network environment(s); or when the target network environment(s) comprise(s) the target BT network environment, the identifier(s) of the target network environment(s) comprise(s) a name(s) of the target BT network environment(s).

4. The method of claim 1, wherein
the MDT configuration information is carried in Logged-MeasurementConfiguration signaling; or,
the MDT configuration information is carried in radio resource control (RRC) ConnectionReconfiguration signaling.

5. A communication system implementing the method of claim 1, comprising the base station and the target terminal device, wherein the target terminal device is configured to:
after receiving the MDT configuration information from the base station, measure the information of the mobile network signal of the target terminal device and measure the information of the target network environment(s) according to the identifier(s) of the target network environment(s) in response to the mobile network signal of the target terminal device being weak, and send the measurement information of the target network environment(s) and the information of the mobile network signal of the target terminal device to the base station; wherein the measurement information of the target network environment(s) is associated with the mobile network signal information of the target terminal device;
measure the information of the target network environment(s) only, without making measurement for information of network devices in all network environments, thereby reducing power consumption of the target terminal device.

6. A method for minimization of drive tests (MDT) measurement, implemented by a target terminal device, the method comprising:
receiving MDT configuration information from a base station, the MDT configuration information comprising an identifier of a network environment with a signal covering an activity region of the target terminal device as an identifier of a target network environment to be measured corresponding to the target terminal device;
making measurement for information of a mobile network signal of the target terminal device;
making measurement for information of the target network environment according to the identifier of the target network environment in response to the mobile network signal of the target terminal device being weak to obtain measurement information of the target network environment; and
sending the measurement information of the target network environment and the information of the mobile network signal of the target terminal device to the base station,
wherein the target terminal device is a Bluetooth device or a wireless fidelity (Wi-Fi) device;
there is one or more identifiers of the target network environment(s), and the target network environment(s) correspond(s) to a plurality of network devices, the plurality of network devices being at least one of Bluetooth devices or Wi-Fi devices for generating signals of corresponding network environment(s); and
wherein one or more signal strengths of the target network environment(s) is/are measured according to the one or more identifiers of the target network environment(s), and an identifier of a network device with a maximum signal strength is determined from the plurality of network devices as the measurement information of the target network environment(s).

7. The method of claim 6, wherein the target network environment(s) comprise(s) at least one of a target Bluetooth (BT) network environment or a target wireless fidelity (Wi-Fi) network environment.

8. The method of claim 7, wherein
when the target network environment(s) comprise(s) the target Wi-Fi network environment, the identifier(s) of the target network environment(s) comprise(s) service set identifier(s) (SSID(s)) of the target Wi-Fi network environment(s); or
when the target network environment(s) comprise(s) the target BT network environment, the identifier(s) of the target network environment(s) comprise(s) a name(s) of the target BT network environment(s).

9. The method of claim 6, wherein
the MDT configuration information is carried in Logged-MeasurementConfiguration signaling; or,
the MDT configuration information is carried in radio resource control (RRC) ConnectionReconfiguration signaling.

10. A device for minimization of drive tests (MDT) measurement, the device being a base station and the device comprising:
a processor; and
memory configured to store at least one instruction, at least one segment of program, a code set or an instruction set, wherein the at least one instruction, the at least one segment of program, the code set or the instruction set is loadable and executable by the processor;
wherein the processor is configured to:
determine an activity region corresponding to a target terminal device, and then determining an identifier of a network environment with a signal covering the activity region as an identifier of a target network environment to be measured corresponding to the target terminal device, wherein the target terminal device is a Bluetooth device or a wireless fidelity (Wi-Fi) device;
send MDT configuration information to the target terminal device, the MDT configuration information comprising the identifier of the target network environment; and
receive measurement information of the target network environment and information of a mobile network signal of the target terminal device from the target terminal device, wherein the measurement information of the target network environment is associated with the information of the mobile network signal of the target terminal device, and the measurement information of the target network environment is obtained by making measurement for information of the target network environment by the target terminal device in response to the mobile network signal being weak,
wherein there is one or more identifiers of the target network environment(s), and the target network environment(s) correspond(s) to a plurality of network devices, the plurality of network devices being at least one of Bluetooth devices or Wi-Fi devices for generating signals of corresponding network environment(s); and
one or more signal strengths of the target network environment(s) is/are measured according to the one or more identifiers of the target network environment(s), and an identifier of a network device with a maximum signal strength is determined from the plurality of network devices as the measurement information of the target network environment(s).

11. The device of claim 10, wherein the target network environment(s) comprise(s) at least one of a target Bluetooth (BT) network environment or a target wireless fidelity (Wi-Fi) network environment.

12. The device of claim 11, wherein,
when the target network environment(s) comprise(s) the target Wi-Fi network environment, the identifier(s) of the target network environment(s) comprise(s) a service set identifier(s) (SSID(s)) of the target Wi-Fi network environment(s); or
when the target network environment(s) comprise(s) the target BT network environment, the identifier(s) of the target network environment(s) comprise(s) a name(s) of the target BT network environment(s).

13. The device of claim 10, wherein
the MDT configuration information is carried in Logged-MeasurementConfiguration signaling; or,
the MDT configuration information is carried in radio resource control (RRC) ConnectionReconfiguration signaling.

14. A device for minimization of drive tests (MDT) measurement, the device being a target terminal device and the device comprising:
a processor; and
memory configured to store at least one instruction, at least one segment of program, a code set or an instruction set, wherein the at least one instruction, the at least one segment of program, the code set or the instruction set is loadable and executable by the processor;
wherein the processor is configured to:
receive MDT configuration information from a base station, the MDT configuration information comprising an identifier of a network environment with a signal covering an activity region of the target terminal device as an identifier of a target network environment to be measured corresponding to the target terminal device;
make measurement for information of a mobile network signal of the target terminal device;
make measurement for information of the target network environment according to the identifier of the target network environment in response to the mobile network signal of the target terminal device being weak to obtain measurement information of the target network environment; and
send the measurement information of the target network environment and the information of the mobile network signal of the target terminal device to the base station,
wherein the target terminal device is a Bluetooth device or a wireless fidelity (Wi-Fi) device;
there is one or more identifiers of the target network environment(s), and the target network environment(s) correspond(s) to a plurality of network devices, the plurality of network devices being at least one of Bluetooth devices or Wi-Fi devices for generating signals of corresponding network environment(s); and
wherein one or more signal strengths of the target network environment(s) is/are measured according to the one or more identifiers of the target network environment(s), and an identifier of a network device with a maximum signal strength is determined from the plurality of network devices as the measurement information of the target network environment(s).

15. The device of claim 14, wherein the target network environment(s) comprise(s) at least one of a target Bluetooth (BT) network environment or a target wireless fidelity (Wi-Fi) network environment.

16. The device of claim 15, wherein,
when the target network environment(s) comprise(s) the target Wi-Fi network environment, the identifier(s) of the target network environment(s) comprise(s) service set identifier(s) (SSID(s)) of the target Wi-Fi network environment(s); or
when the target network environment(s) comprise(s) the target BT network environment, the identifier(s) of the target network environment(s) comprise(s) a name(s) of the target BT network environment(s).

17. The device of claim 14, wherein
the MDT configuration information is carried in Logged-MeasurementConfiguration signaling; or,
the MDT configuration information is carried in radio resource control (RRC) ConnectionReconfiguration signaling.

* * * * *